(12) United States Patent
Semones et al.

(10) Patent No.: US 7,105,975 B2
(45) Date of Patent: Sep. 12, 2006

(54) EFFICIENT AXIAL AIRGAP ELECTRIC MACHINE HAVING A FRONTIRON

(75) Inventors: Burley C. Semones, Roanoke, VA (US); Andrew D. Hirzel, Kalamazoo, MI (US)

(73) Assignee: Light Engineering, Inc., Indianapolis, IN (US)

( * ) Notice: Subject to any disclaimer, the term of this patent is extended or adjusted under 35 U.S.C. 154(b) by 0 days.

(21) Appl. No.: 10/958,903

(22) Filed: Oct. 5, 2004

(65) Prior Publication Data

US 2005/0073212 A1    Apr. 7, 2005

Related U.S. Application Data

(60) Provisional application No. 60/513,892, filed on Oct. 21, 2003, provisional application No. 60/509,222, filed on Oct. 6, 2003.

(51) Int. Cl.
*H02K 1/00*    (2006.01)
*H02K 1/02*    (2006.01)
*H02K 1/06*    (2006.01)
*H02K 21/00*   (2006.01)

(52) U.S. Cl. .................... 310/216; 310/268
(58) Field of Classification Search ........ 310/216–218, 310/254, 268
See application file for complete search history.

(56) References Cited

U.S. PATENT DOCUMENTS

| 4,142,571 | A | 3/1979 | Narasimhan | 164/88 |
|---|---|---|---|---|
| 4,187,441 | A | 2/1980 | Oney | 310/112 |
| 4,265,682 | A | 5/1981 | Tsuya et al. | 148/112 |
| 4,578,610 | A | 3/1986 | Kliman et al. | 310/156 |
| RE32,925 | E | 5/1989 | Chen et al. | 148/403 |
| 4,865,657 | A | 9/1989 | Das et al. | 148/113 |
| 4,881,989 | A | 11/1989 | Yoshizawa et al. | 148/302 |
| 5,814,914 | A * | 9/1998 | Caamano | 310/216 |
| 5,935,347 | A | 8/1999 | Suzuki et al. | 148/121 |
| 6,259,347 | B1 | 7/2001 | Sines | 336/219 |
| 2003/0201687 | A1 * | 10/2003 | Asai | 310/214 |

* cited by examiner

*Primary Examiner*—Tran Nguyen
(74) *Attorney, Agent, or Firm*—Ernest D. Buff & Associates, LLC; Ernest D. Buff; Gordon E. Fish

(57) ABSTRACT

A rotating, dynamoelectric machine, such as an electric motor, a generator, or a regenerative motor, comprises a stator assembly that includes a backiron section, a plurality of stator tooth sections, and a frontiron. The dynamoelectric machine has an axial airgap-type configuration. In addition, the electric machine has a high pole count that operates at high commutating frequencies, with high efficiency, high power density and reduced heating in the rotor. Low-loss materials employed in the dynamoelectric machine include amorphous metals, nanocrystalline metals, optimized Fe-based alloys, and optimized grain-oriented Fe-based materials or non-grain-oriented Fe-based materials.

31 Claims, 7 Drawing Sheets

EFFICIENT AXIAL AIRGAP ELECTRIC MACHINE HAVING A FRONTIRON

RELATED U.S. APPLICATION DATA

This application claims the benefit of co-pending U.S. Provisional Application No. 60/509,222, filed Oct. 6, 2003, entitled "Efficient Axial Airgap Electric Device Having A Frontiron," and Application Ser. No. 60/513,892, filed Oct. 21, 2003, entitled "Efficient High-Speed Electric Device Using Low-Loss Materials," each of which applications is hereby incorporated in the entirety by reference thereto.

BACKGROUND OF THE INVENTION

1. Field of the Invention

The invention relates to a dynamoelectric, rotating machine; and more particularly, to an axial airgap, dynamoelectric, rotating machine comprising a rotor assembly and a stator assembly that includes a frontiron section, a backiron section, and a plurality of stator tooth sections.

2. Description of the Prior Art

The electric motor and generator industry is continuously searching for ways to provide dynamoelectric, rotating machines with increased efficiencies and power densities. As used herein, the term "motor" refers to all classes of motoring and generating machines which convert electrical energy to rotational motion and vice versa. Such machines include devices that may alternatively function as motors, generators, and regenerative motors. The term "regenerative motor" is used herein to refer to a device that may be operated as either an electric motor or a generator. A wide variety of motors are known, including permanent magnet, wound field, induction, variable reluctance, switched reluctance, and brush and brushless types. They may be energized directly from a source of direct or alternating current provided by the electric utility grid, batteries, or other alternative source. Alternatively, they may be supplied by current having the requisite waveform that is synthesized using electronic drive circuitry. Rotational energy derived from any mechanical source may drive a generator. The generator's output may be connected directly to a load or conditioned using power electronic circuitry. Optionally, a given machine is connected to a mechanical source that functions as either a source or sink of mechanical energy during different periods in its operation. The machine thus can act as a regenerative motor, e.g. by connection through power conditioning circuitry capable of four-quadrant operation.

Rotating machines ordinarily include a stationary component known as a stator and a rotating component known as a rotor. Adjacent faces of the rotor and stator are separated by a small airgap traversed by magnetic flux linking the rotor and stator. It will be understood by those skilled in the art that a rotating machine may comprise plural, mechanically connected rotors and plural stators. Virtually all rotating machines are conventionally classifiable as being either radial or axial airgap types. A radial airgap type is one in which the rotor and stator are separated radially and the traversing magnetic flux is directed predominantly perpendicular to the axis of rotation of the rotor. In an axial airgap device, the rotor and stator are axially separated and the flux traversal is predominantly parallel to the rotational axis.

Except for certain specialized types, motors and generators generally employ soft magnetic materials of one or more types. By "soft magnetic material" is meant one that is easily and efficiently magnetized and demagnetized. The energy that is inevitably dissipated in a magnetic material during each magnetization cycle is termed hysteresis loss or core loss. The magnitude of hysteresis loss is a function both of the excitation amplitude and frequency. A soft magnetic material further exhibits high permeability and low magnetic coercivity. Motors and generators also include a source of magnetomotive force, which can be provided either by one or more permanent magnets or by additional soft magnetic material encircled by current-carrying windings. By "permanent magnet material," also called "hard magnetic material," is meant a magnetic material that has a high magnetic coercivity and strongly retains its magnetization and resists being demagnetized. Depending on the type of motor, the permanent and soft magnetic materials may be disposed either on the rotor or stator.

By far, the preponderance of motors currently produced use as soft magnetic material various grades of electrical or motor steels, which are alloys of Fe with one or more alloying elements, especially including Si, P, C, and Al. Most commonly, Si is a predominant alloying element. While it is generally believed that motors and generators having rotors constructed with advanced permanent magnet material and stators having cores made with advanced, low-loss soft materials, such as amorphous metal, have the potential to provide substantially higher efficiencies and power densities compared to conventional radial airgap motors and generators, there has been little success in building such machines of either axial or radial airgap type. Previous attempts at incorporating amorphous material into conventional radial or axial airgap machines have been largely unsuccessful commercially. Early designs mainly involved substituting the stator and/or rotor with coils or circular laminations of amorphous metal, typically cut with teeth through the internal or external surface. Amorphous metal has unique magnetic and mechanical properties that make it difficult or impossible to directly substitute for ordinary steels in conventionally designed motors.

A number of applications in current technology, including widely diverse areas such as high-speed machine tools, aerospace motors and actuators, and compressor drives, require electrical motors operable at high speeds (i.e., high rpm), many times in excess of 15,000–20,000 rpm, and in some cases up to 100,000 rpm. High speed electric machines are almost always manufactured with low pole counts, lest the magnetic materials in electric machines operating at higher frequencies experience excessive core losses that contribute to inefficient motor design. This is mainly due to the fact that the soft material used in the vast majority of present motors is a silicon-iron alloy (Si—Fe). It is well known that losses resulting from changing a magnetic field at frequencies greater than about 400 Hz in conventional Si—Fe-based materials causes the material to heat, oftentimes to a point where the device cannot be cooled by any acceptable means.

To date it has proven very difficult to cost effectively provide readily manufacturable electric devices, which take advantage of low-loss materials. Previous attempts to incorporate low-loss materials into conventional machines generally failed, since the early designs typically relied on merely substituting new soft magnetic materials, such as amorphous metal, for conventional alloys, such as silicon-iron, in machine's magnetic cores. The resulting electric machines have sometimes provided increased efficiencies with less loss, but they generally suffer from an unacceptable reduction in power output, and significant increases in cost associated with handling and forming the amorphous metal. As a result, they have not achieved commercial success or market penetration.

However, a further problem arising in electric machines capable of operating at high frequencies and high speeds is heating in the rotor. As the rotor rotates relative to the stator, the rotor magnets experience cyclic differences in permeance coefficient during the course of each rotation, as the rotor magnets alternately pass between alignment with the teeth of the stator core and positions centered in the gaps between the stator teeth. In turn, this variation in permeance results in changing flux within the rotor, inducing eddy currents in accordance with Faraday's law. Those currents in some cases are high enough to cause significant heating in the rotor. The heating, in turn, is likely to cause irreversible loss of magnetization and reduced device output. In extreme cases, the heating may even be severe enough to reduce the lifetime of the rotor magnets or destroy them.

Accordingly, there remains a need in the art for highly efficient electric devices, which take full advantage of the specific characteristics associated with low-loss material, thus eliminating the disadvantages associated with conventional machines. Ideally, an improved machine would provide higher efficiency of conversion between mechanical and electrical energy forms. Improved efficiency in generating machines powered by fossil fuels would concomitantly reduce air pollution. The machine would be smaller, lighter, and satisfy more demanding requirements of torque, power, and speed. Cooling requirements would be reduced. Motors operating from battery power would operate longer for a given charge cycle. For certain applications, axial airgap machines are better suited because of their size and shape and their particular mechanical attributes. Similar improvements in machine properties are sought for both axial and radial airgap devices

SUMMARY OF THE INVENTION

The present invention provides a dynamoelectric electric machine comprising a rotor assembly, and a stator assembly that includes a frontiron section, a backiron section, and a number of stator tooth sections. The electric device can have any pole count ranging from low to high. Preferably the stator comprises a generally toroidal structure employing laminated layers composed of at least one low core loss material selected from the group consisting of amorphous and nanocrystalline metals and optimized Fe-based alloy. However, other soft magnetic materials may also be used in constructing all or part of the stator assembly. The rotor assembly is supported for rotation about an axis and includes a plurality of poles. The assembly is arranged and disposed for magnetic interaction with the stator assembly. The use of low core loss, advanced soft magnetic materials affords significant flexibility in design, by making possible a wider range of pole counts and commutating frequencies, while also maintaining high operating efficiency, high power density, and a wide range of possible operating speeds.

Examples of electric machines that can be produced and operated in accordance with the invention include, but are not limited to, electric motors, generators, and regenerative motors. One or more of the electric devices could be a component in a composite device or system. An example of such a composite device is a compressor comprising one or more electric motors, where the one or more electric motors may be integral with a fan.

The invention further provides a method of constructing a dynamoelectric machine, comprising: (i) providing at least one stator assembly comprising a backiron section and a plurality of tooth sections, the stator assembly having a slot between each adjacent pair of said tooth sections and stator windings wound through the slots; (ii) providing a frontiron section; and (iii) providing at least one rotor assembly supported for rotation about n axis and including a plurality of poles, the rotor assembly being arranged and disposed for magnetic interaction with the at least one stator assembly.

A dynamoelectric machine system comprises a dynamoelectric machine of the aforementioned type and a power electronics means for interfacing and controlling the machine. The power electronics means is operably connected to the machine.

BRIEF DESCRIPTION OF THE DRAWINGS

The invention will be more fully understood and further advantages will become apparent when reference is had to the following detailed description of the preferred embodiments of the invention and the accompanying drawings, wherein like reference numeral denote similar elements throughout the several views, and in which.

DESCRIPTION OF THE PREFERRED EMBODIMENTS

Preferred embodiments of the present invention will be explained in greater detail hereinafter, with reference to the accompanying drawings.

In one aspect of the present invention, there is provided an electric machine that includes a rotor assembly and a stator assembly having a frontiron section, a backiron, and a plurality of stator tooth sections. As used herein, the term "frontiron" means a structure composed of soft magnetic material and located adjacent to a surface of the stator having the tooth sections, and opposite to the location of the backiron and proximate the rotor. As will be described below in further detail, the presence of a frontiron in combination with the use of low core loss stator materials is preferred for the present machine. In preferred embodiments, the machine is of the permanent magnet, brushless type and the stators and rotors are in an axial airgap-type configuration.

The present machine may comprise one or more rotor assemblies and one or more stator assemblies. Accordingly, the terms "a rotor" and "a stator" as used herein with reference to electric machines mean a number of rotor and stator assemblies ranging from 1 to as many as three or more. In the construction of axial airgap machines, a configuration having a single rotor between two facing stators beneficially reduces axial thrust on the rotor, since the attraction on the rotor from the respective stators is oppositely directed and substantially offset.

General Device Structure

Figure 1:
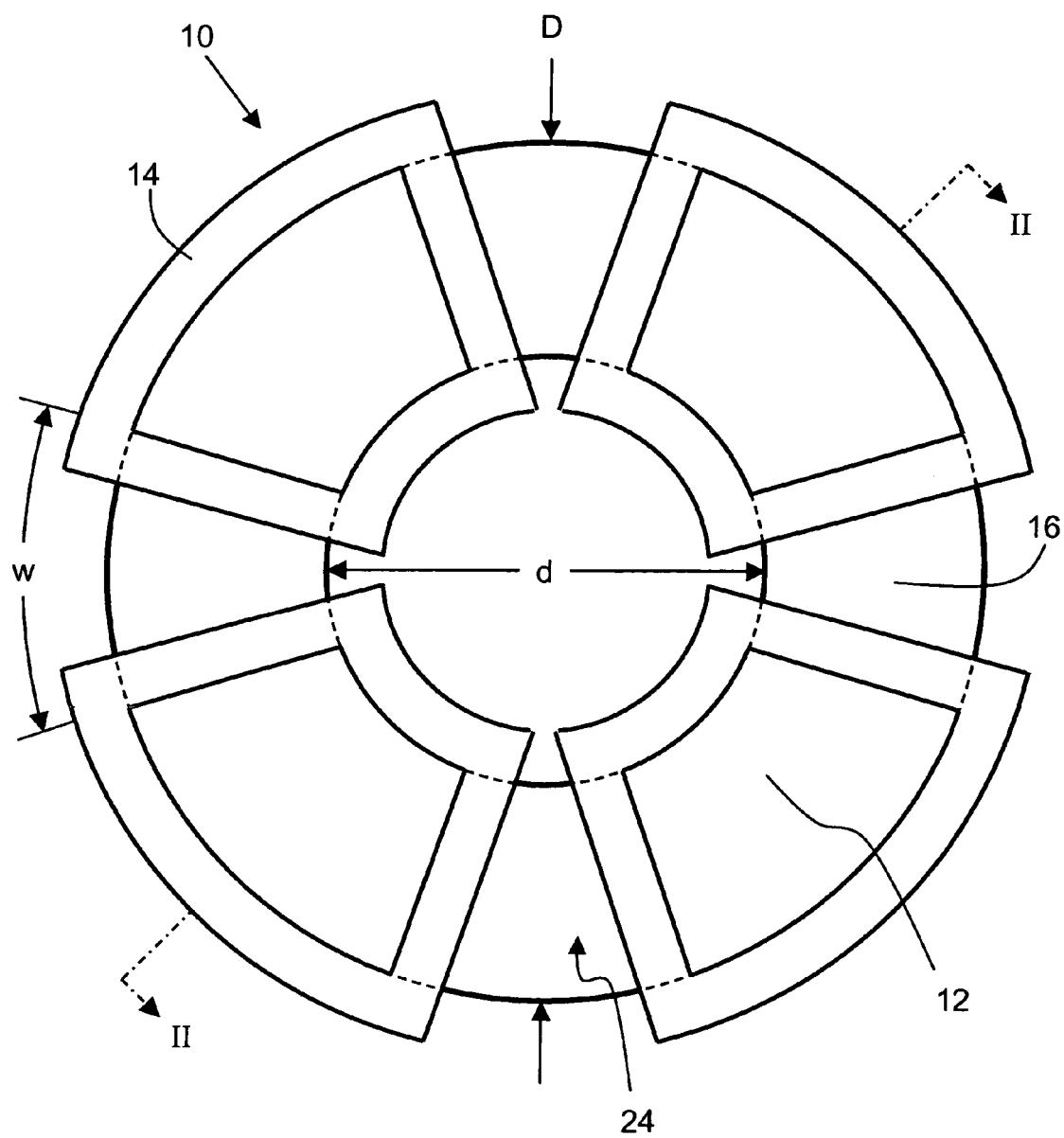
FIG. 1 illustrates a top view of a stator structure according to an aspect of the '094 application, which includes a number of stator tooth sections, stator windings, and a backiron.

Commonly assigned U.S. Provisional Application Ser. No. 60/444,271 ("the '271 application") and U.S. patent application Ser. No. 10/769,094 ("the '094 application"), which are both incorporated herein in the entirety by reference thereto, provide an electric device having a rotor assembly and a stator arranged in an axial airgap configuration, but lacking a frontiron. The stator includes a backiron section and a plurality of stator tooth sections, preferably made using low-loss, high-frequency materials. FIG. 1 illustrates a top view of a stator assembly 10 according to an aspect of the '094 application, showing a unitary structure including stator tooth sections 12 depending from backiron 16 and with stator windings 14 wound around tooth sections 12. The backiron and tooth sections may be formed either as the unitary structure depicted, in which the tooth sections depend integrally from the backiron section, or as separate components secured together by any appropriate means, such as an adhesive. The stator 10 and its windings 14 can be placed in a stator carrier (not shown) and potted with an appropriate organic dielectric. An electric device according to the '094 application further includes a rotor assembly having a plurality of circumferentially spaced-apart permanent magnets arranged in an axial configuration relative to the stator assembly.

A significant problem that can arise during operation of a rotating machine, particularly a brushless permanent magnet machine, involves heating of the rotor assembly due to regular variation in the magnetic environment it experiences in the course of a rotation. The concept of a permeance coefficient (Pc) is frequently used to quantify this effect. In particular, the permeance coefficient is conventionally defined with reference to the second quadrant magnetization (B-H) curve of a magnet at its operating point, and is given by the formula Pc=Bd/Hd, wherein –Hd is the demagnetizing field and Bd is the effective magnetic flux density emanating from the magnet, both being taken at the operating point. Pc changes with position of the rotor during operation, and the operating point moves along the B-H curve accordingly, in a manner that reflects the flux B extant at any given instant. The changing magnetic flux continuously induces eddy currents in the rotor as a consequence of Faraday's law. These circulating currents can produce significant heating in the rotor, up to 10 kW or more in a machine rated at 100 kW, which is severe enough in some cases to cause irreversible magnet losses or even to destroy the rotor magnets. One proposed method for reducing the variation in permeance coefficient experienced by rotor magnets is to introduce salient poles, also referred to as tooth tips, which are formed by a widening of the cross-sectional area of the stator core at the surface presented to the airgap. Nearly all conventional radial airgap machines employ salient poles to increase the magnetic flux directed from the rotor through the stator teeth. Widened pole tips are relatively easy to provide in the stamped laminations ordinarily used in radial gap stators. However, salient poles are difficult to machine into the stator of an axial airgap machine, and as a result it is generally cost prohibitive to add salient poles to an axial airgap machine.

The present invention addresses the problem of heating in the rotor magnets in a cost-effective manner by providing a novel stator assembly that includes a frontiron. The presence of the frontiron reduces the variations in the permeance coefficient experienced by the rotor magnets during rotation, and hence lowers magnetic flux excursions that produce eddy currents in the rotor. The amount of heating in the rotor of an electric device according to the present invention can be greatly reduced, e.g., from 10 kW to 2 kW or less in a machine rated at 100 kW. As a result, the life of the rotor magnets, and hence the electric device, can be significantly prolonged. While the use of a frontiron in high pole count electric machine embodiments is especially desirable, low pole count devices also benefit.

Figure 2:
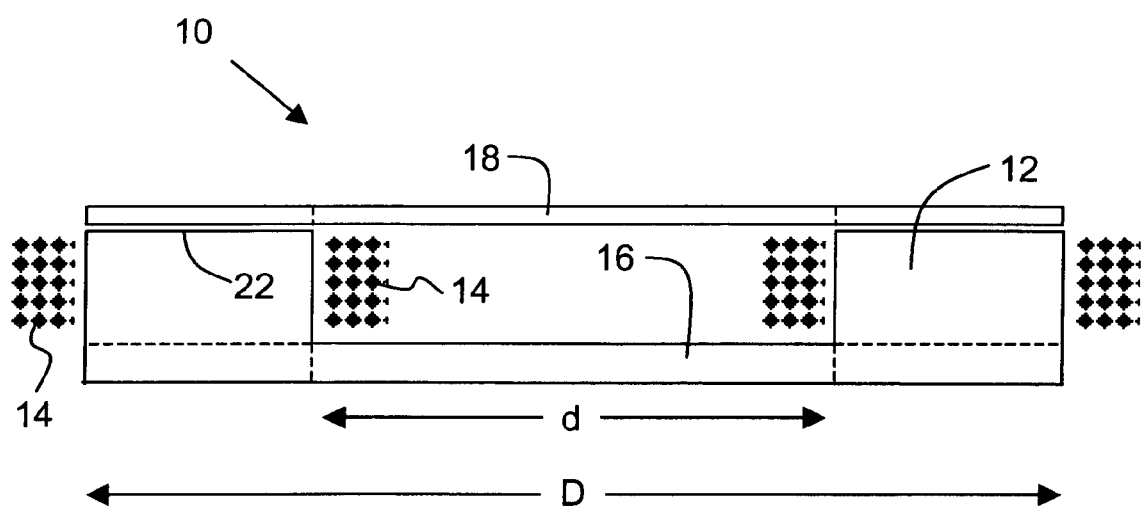
FIG. 2 is a cross-sectional view depicting a stator structure of the invention, which employs a stator structure of the type depicted in FIG. 1 and further includes a frontiron, the view being taken at II—II as shown in FIG. 1.

As depicted by FIG. 2, one form of stator assembly suitable for the present machine is configured by adding a frontiron to a stator of the type shown in FIG. 1. Initially, a metal core is formed by spirally winding low-loss, high-frequency strip material into a toroid. This toroid has the shape of a generally right circular cylindrical shell having an inner diameter and an outer diameter when viewed in the axial direction. The annular end surface region 22 extending radially from inner diameter "d" to outer diameter "D", and circumferentially about the as-formed full toroid, defines a surface area. The metal core has an axial extent that defines a toroid height. After winding, the core is machined to provide slots 16 having outer width "w" that are generally radially directed. The depth of slots 24 extends axially only part-way through the toroid height. The slots reduce the total end surface area of the metal core. The portion of the annular region left after the removal of the slots is the total area (TA), also referred to as the amorphous metal area (AMA) for the embodiments in which the low-loss, high-frequency material is an amorphous metal. Because the slots 24 extend fully from the inner diameter d to the outer diameter D, the stator core's inside and outside diameters in the slotted portion of the toroid are not continuous. The removal of material from the slot spaces produces a plurality of teeth 14. There are an equal number of teeth and slots. The circumferentially continuous material that remains below the slot depth may function as the backiron section 16, which provides closure for flux in the tooth sections 12. In preferred embodiments, the narrowest part of a tooth is not less than 0.1 inch for the sake of formability and mechanical integrity.

The slots 24 are wound with conducting stator windings 14 according to a winding scheme preselected for a given electric device design. Ordinarily, an inexpensive, highly conducting wire such as Cu or Al wire is preferred, but materials and forms may also be used, including other metals and alloys and superconductors. The wire may have any cross-section, but round and square wires are most common. In certain high frequency applications, stranded wires or Litz wire may be advantageous. A preferred winding scheme entails one coil per tooth 12. Each coil ordinarily comprises multiple turns of conductive wire. However, any winding arrangement known in the art is applicable. The windings may be formed in place around the teeth, or they may be separately prepared as an assembly and slipped over the tooth ends.

The stator assembly 10, along with stator windings 14, can be placed in a stator carrier (not shown). Preferably the stator assembly is potted within the stator carrier using an appropriate organic dielectric, such as one that does not induce excessive stress in the stator magnetic material. While the stator carrier is preferably non-magnetic, there is no restriction on the conductivity of the stator carrier material. Factors that can influence the choice of stator carrier material include required mechanical strength and thermal properties. Any appropriate material able to properly support the stator assembly may be used as a stator carrier. In a specific embodiment, the stator carrier is formed from aluminum.

Stator assembly 10 further comprises frontiron 18. In the embodiment shown in FIG. 2, frontiron 18 comprises a wound toroid of low loss soft magnetic material. The frontiron is independently formed and subsequently attached to the tooth faces. This and other embodiments wherein the stator assembly comprises separate components may be formed by joining the constituent parts using an adhesive, clamping, welding, or other methods known in the art. For example, a variety of adhesive agents may be suitable, including those composed of epoxies, varnishes, anaerobic adhesives, cyanoacrylates, and room-temperature-vulcanized (RTV) silicone materials. Adhesives desirably have low viscosity, low shrinkage, low elastic modulus, high peel strength, high operating temperature capability, and high dielectric strength. The stator slots can be wound with stator windings before or after the components are assembled.

In some embodiments, the frontiron functions in other beneficial ways, that may include: (i) reducing or substantially eliminating harmonics in the fundamental frequency of the voltage or current waveform of the device; (ii) improving efficiency of the electric device; and (iii) providing reluctance compensation to reduce torque cogging.

The backiron, frontiron, and tooth sections are composed of a soft magnetic material. In preferred embodiments, the sections are made from low-loss materials such as amorphous metal, nanocrystalline metal, or optimized Fe-based alloy. The same materials need not be used in all the sections. In preferred embodiments, the frontiron is constructed from a wound toroid of soft magnetic material. Even in embodiments wherein the backiron and tooth sections are composed of low loss materials, the frontiron can be made of a conventional material. For example, the frontiron can employ conventional grain-oriented Fe-based material, non-grain-oriented Fe-based material, or other Si—Fe alloy. Use of low-loss material reduces frontiron losses while maximizing other benefits of the frontiron advantages, as discussed in greater detail below. In yet other embodiments, the frontiron comprises an injection-molded material, or a powder of a soft magnetic material that is bonded with an adhesive, organic resin, or other suitable dielectric.

In the embodiment of a stator assembly 10 shown in FIG. 2, the outer and inner diameters of the frontiron approximately equal the outer and inner diameters of the stator cores, and the stator windings extend radially beyond the inner and outer diameter of the frontiron. Preferably, the inner and outer diameters of the frontiron, rotor assembly, and stator assembly are similar, but they need not be identical. In other embodiments, the frontiron section is of a size different from the backiron and tooth sections of the stator assembly. In particular, either or both of the inner and outer diameters of the frontiron may be larger or smaller than the corresponding inner and outer diameters of the backiron and tooth sections.

Other forms of stator construction useful in the practice of the present invention are provided by the aforementioned '271 and '094 applications.

Alternatively, a unitary structure provides the tooth sections and the frontiron. In this implementation of the present method, a relatively larger fraction of material is removed in forming the slots, since the frontiron is ordinarily thinner than the backiron. An independently formed, wound toroid backiron is then attached to the opposite surface of the stator assembly. The stator slots can be wound with stator windings before or after the backiron is attached.

In another embodiment, the stator cores, backiron, and frontiron are all machined as a complete unitary assembly from a single wound toroid of low-loss material and the slots are wound with stator winding.

In yet another embodiment, the both the frontiron and backiron structures are machined from wound toroids. Slots and tooth subsections are provided in a surface of each structure. The structures are assembled in facing relationship with the tooth subsections in each brought into mating abutment. Each tooth section of the stator assembly comprises tooth subsections depending from both the frontiron and backiron portions.

In a further embodiment, the frontiron and backiron sections are formed as cylindrical toroids and separately formed tooth sections are disposed therebetween.

In still other embodiments, the function of the frontiron is carried out by a soft iron structure attached to the rotor in facing relationship with the stator. In axial airgap embodiments, a wound toroid is a suitable form for this frontiron.

Also provided is a stator assembly for a radial airgap machine including a frontiron provided by a stack of annular laminations. In an ordinary configuration with an outside stator and an inside rotor, the outside diameter of the annular laminations is matched to the inside diameter formed by inwardly projecting stator teeth. Of course, in an inside-out motor, the annular laminations encircle the outer diameter of the stator.

The present frontiron is to be distinguished from a thin shield of conductive, but not magnetically permeable material used to mitigate time-varying magnetic flux in the rotor structure. However, such a shield may be used in embodiments of the present machine to supplement the benefits of the frontiron.

Thickness of the Frontiron

It is preferred that the thickness of the frontiron be selected to optimize the performance of the electric device. Too thin a frontiron toroid is ineffective, e.g., in reducing rotor losses. On the other hand, a frontiron that is too thick excessively diverts the path of the magnetic flux of the rotor and/or the stator into the frontiron itself, which can significantly reduce the performance of the electric device. For example, it is preferable that the magnetic flux of the rotor permanent magnets be conducted through the axial length of the stator teeth and hence through the encircling stator coils. Also, the magnetic flux produced by the current flowing through the stator coils is preferably conducted primarily to the airgap.

Optimum thickness for the frontiron can range from fractions of a millimeter (mm) to 1 mm, 2 mm, 5 mm, or more. The optimum thickness varies according to the dimensions and operational requirements of the electric device, the properties of the stator materials, stator windings, frontiron and rotor, as well as their intrinsic magnetic properties. In a specific embodiment, for a frontiron made from Metglas® 2605SA1 or similar Fe-base amorphous alloy, an optimum frontiron thickness is in the range of 0.5 to 1.0 mm for high slot count designs. Lower slot count, high frequency designs may benefit from thicker frontiron. The optimum thickness will also vary with the properties of the rotor permanent magnet materials. Various computer software tools adapted for electromagnetic analysis and available to one of ordinary skill in the art can be used to co-optimize the frontiron thickness with the various parameters that affect the performance of the electric device.

The frontiron thickness is best co-optimized along with other aspects of the device structure and the performance characteristics of the device. Examples of important performance characteristics include selection of a commutating frequency (preferably a high frequency), and maintaining a low inductance and adequate low speed control. Other structural details, such as the optimal balance of conductor and soft magnetic materials and dimensioning of the tooth and backiron sections, are influenced by the inclusion of a frontiron.

The incorporation of amorphous, nanocrystalline, optimized Fe-based alloy, grain-oriented Fe-based, or non-grain-oriented Fe-based material in preferred embodiments of the present electrical device enables the machine's commutating frequency to be increased above 400 Hz with only a relatively small increase in core loss, as compared to the unacceptably large increase that would be seen in conventional machines. The use of the low-loss materials in the stator core accordingly allows the development of the high-frequency, high pole count, electric devices capable of providing increased power density, and improved efficiency. Furthermore, decreases in stator core loss also allow a motor to be operated well past a conventional base speed without the need for torque and power derating frequently necessitated by thermal limits in conventionally designed machines.

Amorphous Metals

Amorphous metals, which are also known as metallic glasses, exist in many different compositions suitable for use in the present motor. Metallic glasses are typically formed from an alloy melt of the requisite composition that is quenched rapidly from the melt, e.g. by cooling at a rate of at least about $10^{6°}$ C./s. They exhibit no long-range atomic order and have X-ray diffraction patterns that show only diffuse halos, similar to those observed for inorganic oxide glasses. A number of compositions having suitable magnetic properties are set forth in U.S. Patent No. RE32,925 to Chen et al. Amorphous metal is typically supplied in the form of extended lengths of thin ribbon (e.g. a thickness of at most about 50 µm) in widths of 20 cm or more. A process useful for the formation of metallic glass strips of indefinite length is disclosed by U.S. Pat. No. 4,142,571 to Narasimhan. An exemplary amorphous metal material suitable for use in the present invention is METGLAS® 2605 SA1, sold by Metglas, Inc., Conway, S.C. in the form of ribbon of indefinite length and up to about 20 cm wide and 20–25 µm thick (see http://www.metglas.com/products/page5_1_2_4.htm).

Other amorphous materials with the requisite properties may also be used.

Amorphous metals have a number of characteristics that must be taken into account in the manufacture and use of magnetic implements. Unlike most soft magnetic materials, amorphous metals (also known as metallic glasses) are hard and brittle, especially after the heat treatment typically used to optimize their soft magnetic properties. As a result, many of the mechanical operations ordinarily used to process conventional soft magnetic materials for motors are difficult or impossible to carry out on amorphous metals. Stamping, punching, or cutting as-produced material generally results in unacceptable tool wear and is virtually impossible on brittle, heat-treated material. Conventional drilling and welding, which are often done with conventional steels, are also normally precluded.

In addition, amorphous metals exhibit a lower saturation flux density (or induction) than conventional Si—Fe alloys. The lower flux density ordinarily results in lower power densities in motors designed according to conventional methods. Amorphous metals also have lower thermal conductivities than Si—Fe alloys. As thermal conductivity determines how readily heat can be conducted through a material from a warm location to a cool location, a lower value of thermal conductivity necessitates careful design of the motor to assure adequate removal of waste heat arising from core losses in the magnetic materials, ohmic losses in the windings, friction, windage, and other loss sources. Inadequate removal of waste heat, in turn, would cause the temperature of the motor to rise unacceptably. Excessive temperature is likely to cause premature failure of electrical insulation or other motor components. In some cases, the over-temperature could cause a shock hazard or trigger catastrophic fire or other serious danger to health and safety. Amorphous metals also exhibit a higher coefficient of magnetostriction than certain conventional materials. A material with a lower coefficient of magnetostriction undergoes smaller dimensional change under the influence of a magnet field, which in turn would likely reduce audible noise from a machine, as well as render the material more susceptible to degradation of its magnetic properties as the result of stresses induced during machine fabrication or operation.

Despite these challenges, an aspect of the present invention provides a motor that successfully incorporates advanced soft magnetic materials and permits motor operation with high frequency excitation, e.g., a commutating frequency greater than about 400 Hz. Construction techniques for the fabrication of the motor are also provided. As a result of the configuration and the use of advanced materials, especially amorphous metals, the present invention successfully provides a motor that operates at high frequencies (defined as commutating frequencies greater than about 400 Hz) with a high pole count. The amorphous metals exhibit much lower hysteresis losses at high frequencies, which result in much lower core losses. Compared to Si—Fe alloys, amorphous metals have much lower electrical conductivity and are typically much thinner than ordinarily used Si—Fe alloys, which are often 200 µm thick or more. Both these characteristics promote lower eddy current core losses. The invention successfully provides a motor that benefits from one or more of these favorable attributes and thereby operates efficiently at high frequencies, using a configuration that permits the advantageous qualities of the amorphous metal, such as the lower core loss, to be exploited, while avoiding the challenges faced in previous attempts to use advanced materials.

Nanocrystalline Metals

Nanocrystalline materials are polycrystalline materials with average grain sizes of about 100 nanometers or less. The attributes of nanocrystalline metals as compared to conventional coarse-grained metals generally include increased strength and hardness, enhanced diffusivity, improved ductility and toughness, reduced density, reduced modulus, higher electrical resistance, increased specific heat, higher thermal expansion coefficients, lower thermal conductivity, and superior soft magnetic properties. Nanocrystalline metals also have somewhat higher saturation induction in general than most Fe-based amorphous metals.

Nanocrystalline metals may be formed by a number of techniques. One preferred method comprises initially casting the requisite composition as a metallic glass ribbon of indefinite length, using techniques such as those taught hereinabove, and forming the ribbon into a desired configuration such as a wound shape. Thereafter, the initially amorphous material is heat-treated to form a nanocrystalline microstructure therein. This microstructure is characterized by the presence of a high density of grains having average size less than about 100 nm, preferably less than about 50 nm, and more preferably about 10–20 nm. The grains preferably occupy at least 50% of the volume of the iron-base alloy. These preferred materials have low core loss and low magnetostriction. The latter property also renders the material less vulnerable to degradation of magnetic properties by stresses resulting from the fabrication and/or operation of a device comprising the component. The heat treatment needed to produce the nanocrystalline structure in a given alloy must be carried out at a higher temperature or for a longer time than would be needed for a heat treatment designed to preserve therein a substantially fully glassy microstructure. Preferably, the nanocrystalline metal is an iron-based material. However, the nanocrystalline metal could also be based on or include other ferromagnetic materials, such as cobalt or nickel. Representative nanocrystalline alloys suitable for use in constructing magnetic elements for the present device are known, e.g. alloys set forth in U.S. Pat. No. 4,881,989 to Yoshizawa and U.S. Pat. No. 5,935,347 to Suzuki et al. Such materials are available from Hitachi Metals, Vacuumschmelze GMBH & Co., and Alps Electric. An exemplary nanocrystalline metal with low-loss properties is Hitachi Finemet FT-3M. Another exemplary nanocrystalline metal with low-loss properties is Vacuumschmelze Vitroperm 500 Z.

Optimized Fe-Based Alloys

The present machines may also be constructed with optimized, low-loss Fe-based crystalline alloy material. Preferably such material has the form of strip having a thickness of less than about 125 μm, much thinner than the steels conventionally used in motors, which have thicknesses of 200 μm or more, and sometimes as much as 400 μm or more. Both grain-oriented and non-oriented materials may be used. As used herein, an oriented material is one in which the principal crystallographic axes of the constituent crystallite grains are not randomly oriented, but are predominantly correlated along one or more preferred directions. As a result of the foregoing microstructure, an oriented strip material responds differently to magnetic excitation along different directions, whereas a non-oriented material responds isotropically, i.e., with substantially the same response to excitation along any direction in the plane of the strip. Grain-oriented material is preferably disposed in the present motor with its easy direction of magnetization substantially coincident with the predominant direction of magnetic flux.

As used herein, conventional Si—Fe refers to silicon-iron alloys with a silicon content of about 3.5% or less of silicon by weight. The 3.5 wt. % limit of silicon is imposed by the industry due to the poor metalworking material properties of Si—Fe alloys with higher silicon contents. The core losses of the conventional Si—Fe alloy grades resulting from operation at a magnetic field with frequencies greater than about 400 Hz are substantially higher than those of low loss material. For example, in some cases the losses of conventional Si—Fe may be as much as 10 time those of suitable amorphous metal at the frequencies and flux levels encountered in machines operating under frequency and flux levels of the present machines. As a result, in many embodiments conventional material under high frequency operation would heat to a point at which a conventional machine could not be cooled by any acceptable means. However, some grades of silicon-iron alloys, herein referred to as optimized Si—Fe, are directly applicable to producing a high-frequency machine.

The optimized Fe-based alloys useful in the practice of the present invention include silicon-iron alloy grades comprising greater than 3.5% of silicon by weight, and preferably more than 4%. The non-grain-oriented Fe-based material used in constructing machines in accordance with the invention preferably consists essentially of an alloy of Fe with Si in an amount ranging from about 4 to 7.5 wt. % Si. These preferred alloys have more Si than conventional Si—Fe alloys. Also useful are Fe—Si—Al alloys such as Sendust.

More preferred non-oriented optimized alloys have a composition consisting essentially of Fe with about 6.5±1 wt. % Si. Most preferably, alloys having about 6.5% Si exhibit near-zero values of saturation magnetostriction, making them less susceptible to deleterious magnetic property degradation due to stresses encountered during construction or operation of a device containing the material.

The objective of the optimization is to obtain an alloy improved magnetic properties, including reduced magnetostriction and especially, lower core losses. These beneficial qualities are obtainable in certain alloys with increased silicon content made by suitable fabrication methods. In some cases, these optimized Si—Fe alloy grades are characterized by core losses and magnetic saturation similar to those of amorphous metal. However, alloys containing more than about 4 at. % Si are difficult to produce by conventional means because of their brittleness due to short-range ordering. In particular, conventional rolling techniques used to make conventional Si—Fe are generally incapable of making optimized Si—Fe. However, other known techniques are used to make optimized Si—Fe.

For example, one suitable form of Fe-6.5Si alloy is supplied as magnetic strips 50 and 100 μm thick by the JFE Steel Corporation, Tokyo, Japan (see also http://wwwjfe-steel.co jp/en/products/electrical/supercore/index.html). Fe-6.5% Si produced by rapid solidification processing, as disclosed by U.S. Pat. No. 4,865,657 to Das et al. and U.S. Pat. No. 4,265,682 to Tsuya et al., also may be used. Rapid solidification processing is also known for preparing Sendust and related Fe—Si—Al alloys.

The core loss of soft magnetic materials can generally be expressed by the following modified Steinmetz equation:

$$L = a \cdot f \cdot B^b + c \cdot f^d \cdot B^e, \text{ where}$$

L is the loss in W/kg, f is the frequency in KHz,

B is the magnetic flux density in peak Tesla, and a, b, c, and d and e are all loss coefficients unique to the soft magnetic material.

Each of the above loss coefficients a, b, c, d and e, can generally be obtained from the manufacturer of a given soft magnetic material. Especially preferred for use in the present stator structure are low core loss magnetic materials characterized by a core loss less than "L" where L is given by the formula $L = 12 \cdot f \cdot B^{1.5} + 30 \cdot f^{2.3} \cdot B^{2.3}$, wherein:

L is the loss in W/kg, f is the exciting frequency in kHz, and

B is the peak magnetic flux density in Tesla.

Rotor Assembly

Figure 3:
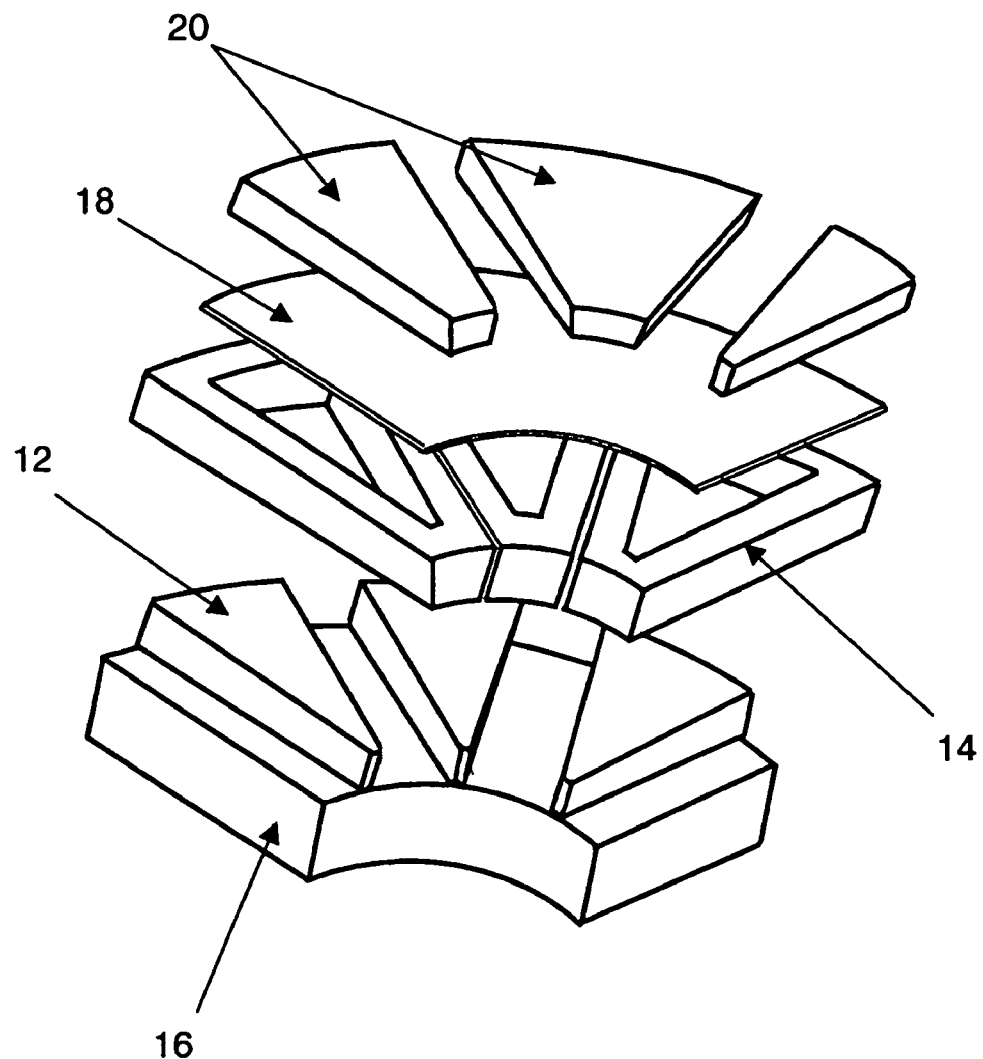
FIG. 3 is a partial exploded view depicting a stator structure and rotor of an embodiment of the axial-airgap electric device according to the present invention, showing the rotor magnets, the frontiron, the stator windings, the stator cores and the backiron, with the rotor carrier omitted for clarity.

FIG. 3 shows a partial exploded view of an embodiment of the electric device of the invention, which includes a backiron 16, a number of stator tooth section cores 12, stator windings 14, the frontiron 18, and a number of rotor magnets 20.

The rotor and stator assemblies are substantially coaxial. In an aspect, the present invention provides an axial airgap, brushless permanent magnet motor that includes a rotor assembly comprising a plurality of magnets 20 disposed in a rotor assembly. The rotor assembly is positioned adjacent to the stator assembly and coaxially disposed on an axis. The magnets possess alternating polarity and are securely positioned circumferentially about the rotor with substantially equal spacing. Different parameters of the rotor magnets, such as size, position, angle, skew, shape, and the like, are selected to achieve the desired performance.

The present rotor assembly can take any form that secures the magnets for rotation in proximity to the frontiron surface of the stator assembly. For example, the rotor magnets 20 can be set into, or mounted onto, a rotor carrier. The rotor assembly can include any number of rotor magnets 20. In some embodiments, the rotor magnets extend through the thickness of the rotor, while in others, they do not.

The magnets can be spaced such that there is little or no circumferential clearance between alternating magnets. It is preferable that the spacing between the magnets be selected to have an optimum value, which also minimizes the occurrence of torque cogging. An optimum spacing is derived from first dividing the low-loss metal area of the stator by the number of stator slots to get the area of each single metal core tooth. The optimum spacing between the magnets will then be such that the total area of each magnet equals 175±20% of the area of a core tooth.

Although the rotor magnets 20 have been described as permanent magnets, this is not a requirement. In alternate embodiments, the rotor includes one or more electromagnets, or, the rotor can be formed from a soft magnetic material, e.g., in induction motor embodiments of the present electric device.

Rotor Materials

Any type of permanent magnet can be used in the present rotor. Rare earth-transition metal alloy magnets such as samarium-cobalt magnets, other cobalt-rare earth magnets, or rare earth-transition metal-metalloid magnets, e.g., NdFeB magnets, are especially suitable. Alternatively, the rotor magnet structure comprises any other sintered, plastic-bonded, or ceramic permanent magnet material. Preferably, the magnets have high maximum BH energy product, high coercivity, and high saturation magnetization, along with a linear second-quadrant normal demagnetization curve. More preferably, oriented and sintered rare earth-transition metal alloy magnets are used, since their higher energy product increases flux and hence torque, while allowing the volume of expensive permanent magnet material to be minimized.

Preferably, the rotor arrangement comprises a disk or axial type rotor assembly including circumferentially spaced-apart, high energy product permanent magnets, such as rare earth-transition metal (e.g., SmCo) or rare earth-transition metal-metalloid magnets (e.g., NdFeB and NdFe-CoB), each having opposite ends defining north and south poles. The rotor and its magnets 20 are supported for rotation about a motor axis, e.g., on a shaft or any other suitable arrangement such that the poles of the magnets are accessible along a predetermined path adjacent the one or more stator assemblies and the frontiron associated therewith. Ordinarily the shaft is supported by bearings of any suitable type known for rotating machines. The magnet area on the rotor has an outer diameter and an inner diameter. In a preferred embodiment, for an axial airgap type rotor, the outer diameter and inner diameter of the magnets 20 are substantially identical to those of the stator assemblies 10. If the outer diameter of the magnets 20 is greater than that of the stator tooth sections 12, then the outer portion of the rotor does not contribute appreciably to performance. If the outer diameter of the rotor is smaller than that of the stator tooth sections 12, the result is a reduction in performance of the electric device. In either case, some of the hard or soft magnetic material present in the machine increasing cost and weight, but without improving performance. In some cases, the extra material even diminishes performance of the machine.

Rotor Losses

Preferred embodiments of the present electrical machine that include a frontiron provide a number of beneficial attributes, including reduced eddy current and hysteresis losses in the rotor assembly, and reduction of torque cogging and torque ripple. In many cases, these benefits offset the added cost and complexity of adding the frontiron, the losses in the frontiron itself, and the slightly decreased machine output.

A rotor assembly frequently includes materials that conduct electricity, such as the permanent magnets themselves or the rotor carrier. As explained above, any conductor in a changing magnetic field will experience an induced voltage, as expressed by Faraday's law. This induced voltage in the conductive material creates circulating currents that are commonly called eddy currents. The heat generated by eddy currents in the material is given as a function of the current (I) and the resistance (R) by the ordinary expression $I^2 \times R$. Eddy currents are unwanted sources for losses in any electric device, since they do not provide useful torque. Therefore, a goal of a device designer is the complete elimination of eddy currents.

Eddy current dissipation ordinarily increases with the size of electrically contiguous blocks, and in proportion to the electrical conductivity of the material. Therefore, eddy current dissipation is often reduced by dividing the material into laminations separated by electrically non-conductive material. For this reason, conventional soft magnetic materials used in transformers and rotating machines are ordinarily formed as thin laminations made by rolling processes. However, the markedly different mechanical properties of permanent magnet materials make the lamination approach much more difficult, if not impractical and cost prohibitive for rotor construction.

The highest known flux-producing permanent magnets, the rare-earth type magnets, are electrically conductive, and are thus prone to exhibit undesirably large eddy current losses. These losses are theoretically a function of the square of the changing magnetic field, the square of the frequency of change, and the specific conductivity of the material. In practice the dimensions of the material (lamination thickness and length) greatly impact the resistance.

Non-linear magnetic materials, including both hard and soft magnets, exhibit some hysteresis in a changing magnetic field, which is a lagging in the response of the materials internal magnetic properties as external conditions vary. The lagging can be conceptualized as if caused by an internal friction. Hysteresis can be an additional cause of loss due to heating in the material, which varies as a function of the material's intrinsic magnetic properties.

These materials can experience hysteresis in small or "minor" loops, which do not cover all four quadrants of the hysteresis B-H curve and thus represent less than a full magnetization reversal. For example, in soft magnetic material these minor loops are generally found in the first or third quadrant of the B-H curve. Hard magnets, such as those used in the rotor assembly in certain implementations of the present machine, follow such minor loops in the second or fourth quadrant as a result of cyclic permeance variation, as described hereinabove. The area of each loop represents losses due to the hysteresis loss to the electric device.

Variations in Permeance Coefficient

As noted above, the rotor of an electric machine almost invariably experiences a significant cyclic variation in flux density as the rotor/stator magnetic circuit changes with rotation. This change is best understood by reference to the permeance coefficient. The permeance coefficient (Pc) can serve as a measure of the ability of the magnetic circuit of the rotor, stator, and airgap to conduct magnetic flux. As the rotor rotates, the permeance coefficient is maximal at the positions in which the rotor magnet is most closely aligned with a stator core tooth and minimal when the magnet is located in the intermediate position between the teeth. The magnetic flux density, both inside and outside the rotor magnet, varies commensurately. It is this periodic variation of flux density within the rotor magnet that induces the eddy currents that give rise to heating.

The frequency at which the eddy current and hysteresis losses occur is usually not at the expected synchronous frequency of the machine, which is given by the equation:

Synchronous frequency=speed×number of permanent magnet (rotor) pole pairs.

Rather, these losses occur at a frequency with which the rotor magnets are moving into and out of the varying permeance coefficient conditions, which is given by a function of the number of stator teeth:

Rotor Loss frequency=speed×number of stator teeth.

This rotor loss frequency is three times greater than the synchronous frequency for an electric device with a slot per phase per pole ratio of 0.5, as discussed hereinbelow in greater detail.

Frontiron Impact on Rotor Losses

Figure 4:
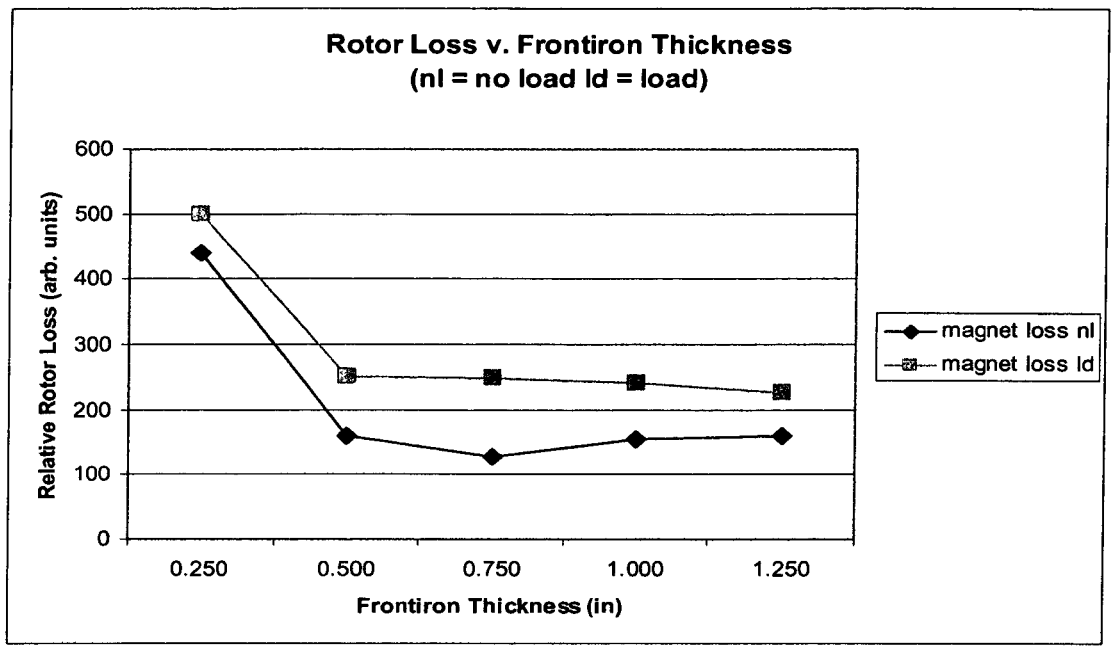
FIG. 4 is a plot of the rotor loss versus frontiron thickness of an electric device according to the invention under a load (□) or no load (◇)

The addition of the frontiron to the stator assembly greatly modifies the permeance coefficient at all positions for the rotor. The frontiron reduces the magnitude of the low-high-low flux variations that are inevitably present without the addition of the frontiron. Beneficially, the frontiron provides a low-reluctance flux path that partially "bridges" the open slots in the stator with soft magnetic material. The plot of FIG. 4 shows that, as the variations in B in the rotor decrease with increasing frontiron thickness, so do the unwanted eddy current and hysteresis losses in the rotor.

Reducing Torque Cogging and Torque Ripple

A further benefit seen in some machines that include a frontiron is a reduction in torque ripple and torque cogging. Desirably, a machine would operate with a torque that does not vary with angular position of the rotor. However, as explained above, an electric machine inevitably has some variation in the permeability of its rotor-stator magnetic circuit with rotor angle. Therefore, there is inevitably some torque variation as well. An electrical machine designer preferably attempts to eliminate torque variations to produce a smooth output with substantially constant torque. Excess torque ripple also gives rise to undesirable acoustic noise. In the dynamoelectric machine art, a distinction is often made between torque cogging and torque ripple. The former refers to perturbations or variation of torque with rotational position with no current input/output to the machine, while the latter refers to torque variation during operation, i.e. under power loading. However, ripple and cogging are physically related phenomena, and are sometimes considered as being interchangeable. Torque ripple is affected by both the design of the electric device and power electronics operation. Torque cogging is largely dependent on machine design parameters. As the present invention is mainly concerned with the design of the electric device, however, torque cogging and torque ripple can be considered together.

The addition of the frontiron reduces the variations in the permeance coefficients for the different positions, causing the absolute value of the magnetic flux crossing the airgap to be more constant. As a result, torque cogging is reduced. If the thickness of the frontiron is increased without limit, then torque-cogging approaches zero.

Torque cogging is affected by the variations in permeance coefficient. As predicted by Gauss's law, at any given instance in time, the net magnetic field crossing the airgap is zero. However, there are positions of the rotor, relative to the stator, wherein the permeance coefficient is higher than for other positions. At these positions the absolute value of the magnetic flux is greater than for positions where the permeance coefficient is lower. Moving the rotor from the high Pc positions to the low Pc positions results in torque production. For example, in a device with an SPP value of 0.5, there are six high permeance positions for each rotor pole pair. Torque cogging is observed as the result of the rotor "jumping" from one high permeance coefficient position to the next high permeance coefficient position.

Effect of Frontiron on Performance and Losses

The addition of the frontiron increases the cost of the device, through the use of additional material and the addition of processing steps, but this cost is ordinarily offset by the many gains in the performance of the electric device.

Figure 5:
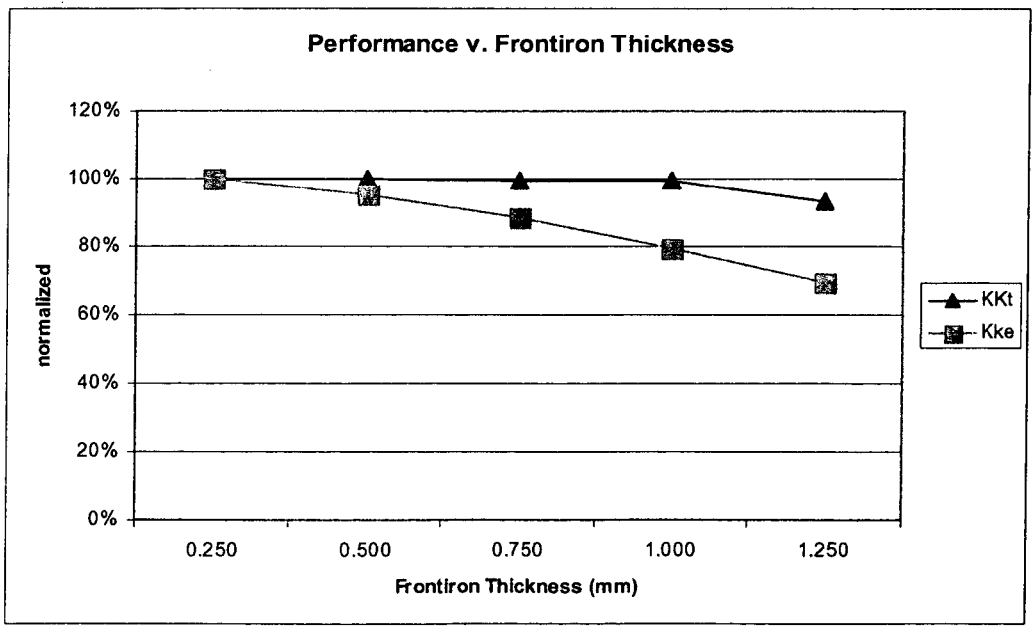
FIG. 5 is a plot of the performance versus frontiron thickness of an electric device according to the invention.

The output of any machine is greatly dependent on the interaction of the magnetic flux in the airgap. Unexpectedly, the use of a frontiron with a properly chosen thickness actually increases the amount of magnetic flux in the stator cores, relative to the conditions without the frontiron. An increase in the amount of magnetic flux in the stator cores beneficially increases the output of the electric device. However, the increase is slight, and generally occurs for frontiron thicknesses on the order of 0.25 mm or less, as shown in FIG. 5. A frontiron that is too thick reduces the amount of stator magnetic flux produced by the current flowing in the stator coils that reaches the airgap, since the frontiron can cause the flux from a stator core (including the tooth) to be "shunted" to an adjacent stator core or tooth. Therefore the optimization of the frontiron thickness should take into account the impact on the device output.

Figure 6:
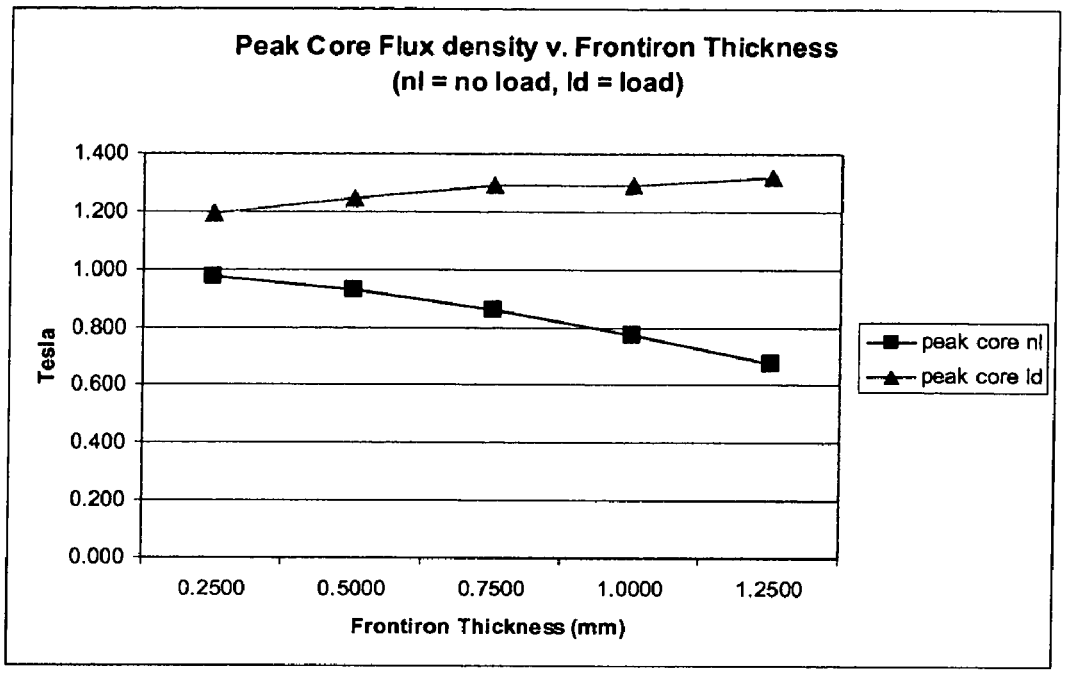
FIG. 6 is a plot of the peak stator core flux density versus frontiron thickness of an electric device according to the invention under a load (Δ) or no load (□)

The frontiron itself experiences changing flux, resulting in eddy and hysteresis losses. These can be significantly reduced by selecting a low-loss material and suitably optimizing the frontiron thickness. The addition of the frontiron also results in somewhat greater flux densities in the stator core, while not producing greater torque output. The higher flux densities in the core structure will inevitably produce higher losses in the core, as illustrated in FIG. 6. In most cases the added losses in the stator are more than offset by decreased losses in the rotor magnets. Accordingly, it is preferred that stator loses be considered in optimizing the frontiron thickness, so that the overall performance of the machine is enhanced.

High Pole Count High-Frequency Design Using Low Loss-Materials

The present structure and method are applicable to electric devices having a pole count ranging from low to high. However, the benefits of including a frontiron are especially realized in embodiments wherein the use of low-loss materials in the stator permits design of high pole count electric devices that operate at high frequencies. In specific embodiments, the present invention provides a axial airgap electric device with a high pole count that operates at high frequencies, ie., a commutating frequency greater than about 400 Hz. In some cases, the device is operable at a commutating frequency ranging from about 500 Hz to 3 kHz or more. Designers ordinarily have avoided high pole counts for high speed motors, since conventional stator core materials, such as Si—Fe, cannot operate at the proportionately higher frequencies necessitated by the high pole count. In particular, known devices using Si—Fe cannot be switched at magnetic frequencies significantly above 400 Hz due to core losses resulting from changing magnetic flux within the material. Above that limit, core losses cause the material to heat to the point that the device cannot be cooled by any acceptable means, Under certain conditions, the heating of the Si—Fe material may even be severe enough that the machine cannot be cooled whatsoever, and will self-destruct. However, it has been determined that the low-loss characteristics of suitable amorphous, nanocrystalline and optimized Fe-based metals allow much higher switching rates than possible with conventional Si—Fe materials. While, in a preferred embodiment, the choice of amorphous metal alloy, such as METGLAS® 2605SA1 alloy, removes the system limitation due to heating at high frequency operation, the rotor design and overall motor configuration are also improved to take better advantage of the beneficial properties of the amorphous material.

The ability to use much higher exciting frequencies permits the present machines to be designed with a much wider range of possible pole counts. The number of poles in the present device is a variable based on the permissible machine size (a physical constraint) and on the expected performance range. Subject to allowable excitation frequency limits, the number of poles can be increased until magnetic flux leakage increases to an undesirable value, or performance begins to decrease. The use of a frontiron also helps to minimize leakage.

There is also a mechanical limit presented by stator construction on the number of rotor poles, since stator slots must coincide with the rotor magnets. Mechanical and electromagnetic constraints in concert limit the number of slots that can be made in the stator. These effects, in turn, are in part a function of the frame size of the machine. Some boundaries can be set to determine an upper limit on slot number for a given stator frame that provides a proper balance of copper and soft magnetic material. Adjustment of the balance can be used as a parameter in making well performing axial gap machines. The present invention provides motors that optimally have about 4 or 5 times the number of poles typical for current industrial machines.

As an example, for an industry typical motor having 6 to 8 poles, and operating at speeds of about 800 to 3600 rpm, the commutating frequency is about 100 to 400 Hz. The commutating frequency (CF) is the rotating speed multiplied by the number of pole pairs, where the pole pairs is the number of poles divided by two, and the rotating speed is in units of revolutions per second (CF=rpm/60×pole/2). Also available in industry are devices with 16 or more poles, but speeds of less than 1000 rpm, which still correspond to a frequency less than 400 Hz. Alternatively, motors are also available with a relatively low pole count (e.g. less than 6 poles), and with speeds up to 30000 rpm, which still have a commutating frequency less than about 400 Hz. In representative embodiments, the present invention provides machines that have 96 poles, for 1250 rpm at 1000 Hz; 54 poles, for 3600 rpm at 1080 Hz; 4 poles, for 30000 rpm at 1000 Hz; and 2 poles, for 60000 rpm at 1000 Hz. The high frequency machines of the invention can operate at frequencies of about 4 to 5 times higher than known axial airgap motors made with conventional materials and designs. The machines provided are generally more efficient than typical motors in the industry when operated in the same speed range, and as a result provide greater speed options. The present configuration is particularly attractive for the construction of motors having a very wide range of speed, power, and torque ratings, in a manner that combines high energy efficiency, high power density, ease of assembly, and efficient use of expensive soft and hard magnetic materials.

Thermal Properties and Efficiency

One of the characteristics that limits attainable device output efficiency in all electric machines, including both those using conventional Si—Fe alloys and those using amorphous, nanocrystalline, optimized Si—Fe alloy, grain-oriented Fe-based or non-grain-oriented Fe-based metals, is the loss of energy to waste heat. This waste heat comes from a number of sources, but predominantly from ohmic losses, skin and proximity effect losses in the windings, rotor losses from eddy currents in magnets and other rotor components, and core loss from the stator core. The "continuous power limit" of conventional machines is often determined by the maximum speed at which the machine can operate continuously while still dissipating enough of the waste heat to prevent an unacceptable temperature rise. The continuous power limit is a function of the current.

In the high frequency, high pole count electric devices optimally applicable in the practice of the present invention, less waste heat is generated because amorphous, nanocrystalline, and optimized Fe-based metal alloy have lower losses than conventional Si—Fe. The designer can exploit the low loss characteristics of these materials by increasing the frequency, speed and power, and then correctly balancing and "trading" the low core loss versus the ohmic loss. Overall, for the same power as conventional machines, the high frequency, high pole count electric devices optimally applicable in the present invention exhibits lower loss, and hence higher torques and speeds, and can thus achieve higher continuous speed limits than conventional machines.

One advantage of the machine preferred in the practice of an aspect of the present invention is the ability to maximize the device's efficiency while maintaining cost effectiveness. As is conventional, device efficiency is defined as useful power output divided by power input. The high-frequency, high pole count electric devices optimally applicable in the present invention operate simultaneously at higher commutating frequencies with the high pole count, resulting in a more efficient device having low core losses and high power density. They exceed the industry standard high frequency limit of 400 Hz beyond which there have heretofore been few, if any practical applications.

The performance and increased efficiency of the preferred high-frequency, high pole count electric devices applicable to the present invention is not simply an inherent feature of replacing conventional Si—Fe with amorphous metal. A number of designs have been proposed, but have met with performance failure (including overheating and lower output power). This failure is believed to have arisen in large measure as a result of merely applying new materials (e.g., amorphous metals) and production methods in manners that were designed for, and suitable to, a conventional material (Si—Fe containing 3.5% or less of Si by weight). The early performance failure, combined with the perceived cost of processing amorphous metal into motors, led the industry to abandon the research efforts.

The high-frequency, high pole count electric devices optimally applicable in the present invention overcome the performance failures of the prior art through the design of a rotating electric device that exploits the amorphous, nanocrystalline, optimized Si—Fe alloy, grain-oriented Fe-based or non-grain-oriented Fe-based materials' properties. Also provided are construction methods compatible with the physical and mechanical characteristics of the various improved materials. These designs and method provide machines that possess some or all of various advantageous qualities, including operating at commutating frequencies greater than 400 Hz, with a high pole count, at high efficiency and with a high power density. While other conventional methods have been able to provide motors with at most one or two of the four qualities, among the embodiments provided herein are high frequency, high pole count electric devices that exhibit some, and preferably all of, the four qualities simultaneously. Compared to machines such as those provided by the '094 application, the present machine provides another mechanism by which losses in the rotor may be reduced, namely through use of a frontiron in the stator assembly.

In many embodiments, the present high-frequency, high pole count electric machines beneficially exhibit high efficiency. A major contribution to the improvement results from significantly reduced hysteresis losses. As is known in the art, hysteresis losses result from impeded domain-wall motion during the magnetization of all soft magnetic materials. Such losses are generally higher in conventionally used magnetic materials, such as conventional grain-oriented Si—Fe alloys and non-oriented motor and electrical steels, than in the improved materials preferably employed in the present machines. High losses, in turn, can contribute to the overheating of the core. As a result of the increased efficiency, the high frequency, high pole count electric devices optimally applicable in the present invention are capable of achieving a greater continuous speed range. Conventional motors are limited in that they can either provide low torque for high-speed ranges (low power), or high torque for low-speed ranges. The high frequency, high pole count electric devices optimally applicable in the present invention successfully provide electric devices with high torque for high-speed ranges.

Slot Per Phase Per Pole Ratios

The slot per phase per pole (SPP) value of an electric machine is determined by dividing the number of stator slots by the number of phases in the stator winding and the number of DC poles (SPP=slots/phases/poles). In the present description, a pole refers to the non-time-varying magnetic field, also referred to herein as a DC field, which interacts with a changing magnetic field, i.e., one that varies in magnitude and direction with both time and position. In the preferred embodiments, permanent magnets mounted on the rotor provide the DC field, and hence the number of non-time-varying magnetic poles, referred to herein as DC poles. In other embodiments, a DC electromagnet can provide the rotor DC field. The electromagnets of the stator windings provide the changing magnetic field. A slot refers to the spacing between alternating teeth of the stator of the present machine. The techniques of the present invention are applicable to electric devices with any SPP value. Beneficially, the design of the present machine affords considerable flexibility in the selection of an optimal SPP ratio.

Conventional machines are frequently designed to have an SPP ratio of 1 to 3 to obtain acceptable functionality and noise levels and to provide smoother output due to better winding distribution. However, designs with a lower SPP value, e.g. 0.5, have been sought to reduce the effect of end turns. End turns are the portions of wire in the stator coils that connect the windings between slots. Although such connection is, of course, required, the end turns do not contribute to the torque and power output of the machine. In this sense they are undesirable, because they increase the amount of wire required and contribute ohmic losses to the machine while providing no benefit. Hence, one goal of the motor designer is to minimize end turns and provide a motor with manageable noise and cogging. On the other hand, preferred implementations of the present motor allow reduced SPP ratio, along with desirably low noise, cogging, and power electronics ripple described in greater detail hereinbelow. Such a benefit is obtained by operating with a high pole and slot count. These options were not viable in previous machines, because the required increase in commutating frequency is unacceptable without the use of advanced, low loss stator materials.

For some applications, it is advantageous to build a motor with a fractional value of SPP, since such a motor may employ pre-formed coils disposed around a single stator tooth. In different embodiments of the present machine, the SPP ratio is an integral ratio, such as 0.25, 0.33, or 0.5. SPP values of 1.0, or even greater than 1.0, are also possible. Preferably, SPP values range from about 0.25 to 4.0. However, more preferred embodiments of the present machine are beneficially designed with an SPP ratio of 1 or less, and even more preferably 0.5 or less. It is possible to wire multiple slots into a common magnetic section, thereby providing an SPP greater than 0.5. This is the result of there being a greater number of stator slots than rotor poles, resulting in a distributed winding. A value of SPP less than or equal to 0.5 indicates that there are no distributed windings. A convention in the industry is to include distributed windings in the stator. Ordinarily, prior art machines designed with distributed windings have many slots per pole, resulting in lower frequency operation. As a result, in conventional machines that have SPP of 0.5 or less, and operate at low frequency, there will also be a low pole count and high, difficult to control cogging. On the other hand, the use of advanced magnetic materials in the present machine permits the commutating frequency to be raised, so that low SPP values can be maintained, while still minimizing cogging and without reducing the machine speed. However, while the methods of the present invention are applicable to an electric device with SPP values below 0.5 (e.g. 0.25), such a configuration sometimes is made less desirable by practical considerations, including increased machine reactance at the higher commutating frequency required, somewhat increased leakage flux from the rotor magnets, and the mechanical support needed to accommodate the rotor magnets which are smaller and numerous. A low SPP value often is less advantageous for other important parameters of the electric device as well.

On the other hand, increasing the SPP value effectively increases the pole pitch of the machine. For example, multiple stator slots can be wired into a common magnetic section, which corresponds to a slot per phase per pole (SPP) value greater than 0.5.

Although the present machine may be designed and operated as a single-phase device, or a polyphase device with any number of phases and a commensurate number of windings on each of the stators, a three-phase machine with three-phase windings is preferred in accordance with industry convention, as it provides efficient utilization of both hard and soft magnetic materials, along with good power density. Embodiments with SPP ratios of 0.5 are particularly suited for three-phase applications. For example, in a three-phase machine, with a slot/pole/phase ratio=0.5, the number of rotor poles is two-thirds the number of stator slots, with the number of slots being a multiple of the number of phases. While the machine is usually wired in three-phase wye configuration in accordance with industry convention, a delta-configuration may also be employed. In a preferred embodiment provided by the present invention, the frontiron is applicable to an electric device with an SPP value optimally equal to 0.5.

Flexibility in Wiring/Winding Design

A further advantage of certain embodiments of the present machine is the flexibility of utilizing different wiring configurations. Traditional stator designs limit winding design choices because of the above-mentioned focus on using SPP ratios of 1.0 to 3.0, which require distributing the windings over multiple slots. It becomes difficult to have more than two or three winding options with distributed windings. The present invention provides the ability to take advantage of the SPP=0.5 design, wherein there is typically only one discrete coil per stator core (including the tooth). However, the invention does not exclude other arrangements with SPP=0.5. The single core coil can be easily modified and re-connected to provide any voltage demanded by a given application. Thus, given an SPP ratio approaching 0.5 as in the device of this invention, there is significant flexibility as to stator winding configurations. For example, the manufacturer may wind each stator separately from one another, or the manufacturer may provide separate stator windings within the same stator. This capability is one of the advantages of a system with a SPP equal to 0.5. Although there have occasionally been industry systems that employ SPP=0.5, they are not widespread and have met with success only in niche applications. The present invention successfully provides a system with SPP equal to 0.5 that allows for this flexibility in winding.

Thus a given hardware configuration can provide a broad range of solutions, simply by changing the stator coils or their interconnection. Generally, the coil is the easiest component in an electromagnet circuit to modify. Significant economies and simplification are provided to the manufacturer, who needs fewer standard designs, to the distributor, who can maintain a simpler inventory, and to the user, who can modify a given machine to accommodate changing use requirements.

Machine System and Power Electronics Control

In yet another aspect, there is provided a dynamoelectric machine system comprising an axial airgap electric machine of the aforementioned type and power electronics means for interfacing and controlling the machine. The system may function as a motor or generator or a combination thereof. Motoring machines must be supplied with AC power, either directly or by commutation of DC power. Although mechanical commutation has long been used with brush-type machines, the availability of high-power semiconductor devices has enabled the design of brushless, electronic commutation means that are used with many modern permanent magnet motors. In generating mode, a machine (unless mechanically commutated) inherently produces AC.

A large proportion of machines are said to operate synchronously, by which is meant that the AC input or output power has a frequency commensurate with the rotational frequency and the number of poles. Synchronous motors directly connected to a power grid, e.g. the 50 or 60 Hz grid commonly used by electric utilities or the 400 Hz grid often used in shipboard and aerospace systems, therefore operate at particular speeds, with variations obtainable only by changing pole count. For synchronous generation, the rotational frequency of the prime mover must be controlled to provide a stable frequency. In some cases, the prime mover inherently produces a rotational frequency that is too high or low to be accommodated by motors that have pole counts within practical limits for known machine designs. In such cases, the rotating machine cannot be connected directly to a mechanical shaft, so a gearbox often must be employed, despite the attendant added complexity and loss in efficiency. For example, wind turbines rotate so slowly that an excessively large pole count would be required in a conventional motor. On the other hand, to obtain proper operation with desired mechanical efficiency, typical gas turbine engines rotate so rapidly that even with a low pole count, the generated frequency is unacceptably high. The alternative for both motoring and generating applications is active power conversion. Embodiments of the present electric machine including a stator assembly with a frontiron are beneficially employed with active power conversion, especially in applications involving a wide speed range and/or disparate power requirements.

As used herein, the term "power electronics" is understood to mean electronic circuitry adapted to convert electric power supplied as direct current (DC) or as alternating current (AC) of a particular frequency and waveform to electric power output as DC or AC, the output and input differing in at least one of voltage, frequency, and waveform. The conversion is accomplished by a power electronics conversion circuitry. For other than a simple voltage transformation of AC power using an ordinary transformer that preserves frequency, and simple bridge rectification of AC to provide DC, modern power conversion ordinarily employs non-linear semiconductor devices and other associated components that provide active control.

As discussed hereinabove in greater detail, machines constructed in accordance with the present invention are operable as motors or generators over a much wider range of rotational speed than conventional devices. In many cases, the gearboxes heretofore required in both motor and generator applications can be eliminated. However, the resulting benefits also generally require the use of power electronics operable over a wider electronic frequency range than employed with conventional machines.

For motoring applications of the dynamoelectric machine system, the machine is interfaced to an electrical source, such as the electrical power grid, electrochemical batteries, fuel cells, solar cells, or any other suitable source of electrical energy. A mechanical load of any requisite type may be connected to the machine shaft. In generating mode, the machine shaft is mechanically connected to a prime mover and the system is connected to an electrical load, which may include any form of electrical appliance or electrical energy storage. The machine system may also be employed as regenerative motor system, for example as a system connected to the drive wheels of a vehicle, alternately providing mechanical propulsion to the vehicle and converting the vehicle's kinetic energy back to electrical energy stored in a battery to effect braking.

Power electronics means useful in the present axial airgap machine system ordinarily must include active control with sufficient dynamic range to accommodate expected variations in mechanical and electrical loading, while maintaining satisfactory electromechanical operation, regulation, and control. The means should perform satisfactorily over the range of phase impedances that arise from the aforementioned changing permeance during each revolution. Any form of power conversion topology may be used, including switching regulators employing boost, buck, and flyback converters and pulsewidth modulation. Preferably both voltage and current are independently phase-controllable, and control of the power electronics may operate either with or without direct shaft position sensing. In addition, it is preferred that four-quadrant control be provided, allowing the machine to operate for either clockwise or counterclockwise rotation and in either motoring or generating mode. Both current-loop and velocity-loop control circuitry is preferably included, whereby both torque-mode and speed-mode control are can be employed. For stable operation, power electronics means must preferably have a control-loop frequency range at least about 10 times as large as the intended commutating frequency. For the present system, operation of the rotating machine at up to about 2 kHz commutating frequency thus requires a control-loop frequency range of at least about 20 kHz. Controllers used in motoring operations typically employ IGBT semiconductor switching elements. These devices exhibit an increase in switching losses with frequency, so that it is ordinarily preferred to operate with commutating frequencies of up to about 1000 Hz. Motor systems are thus advantageously designed with commutating frequency ranging from about 600 to 1000 Hz, allowing use of less expensive IGBTs while retaining the benefits (e.g. increased power density) resulting from the higher operating frequencies made possible by low-loss materials. For generating applications, suitable rectifier bridges permit operation at even higher commutating frequencies.

The following examples are provided to more completely describe the present invention. The specific techniques, conditions, materials, proportions and reported data set forth to illustrate the principles and practice of the invention are exemplary and should not be construed as limiting the scope of the invention.

EXAMPLES

Optimized Frontiron Thickness for 15 kRPM Electric Device

An analysis of the optimized frontiron thickness is performed for a low pole count, high frequency, 15 k RPM electric device with the following specifications:

| | |
|---|---|
| Slots per Stator | 12 |
| Poles | 8 |
| RPM | 15000 |
| Frequency | 1000 Hz |
| Core OD | 248 mm |
| Axial Length (active) | 89 mm |
| Magnet Axial Length | 20.3 mm |
| Airgap Length | 2.0 mm |
| Output Power | 100 kW |
| Supply Voltage, line | 480 Vrms |

The machine includes one rotor and one stator and is a low pole count, high frequency, three phase electric device running as an actively rectified generator at 15 kRPM. The frontiron is constructed from METGLAS 2605SA1 amorphous metal wound as a toroid. The analysis is repeated for similar 100 kW power output electric devices with frontiron thickness ranging from 1.9 to 6.4 mm and compared with properties of a device without such a frontiron. The rotor is made of high energy product FeNdB permanent magnets housed in a carrier made of non-electrically-conductive composite, which reduces losses.

Figure 7:
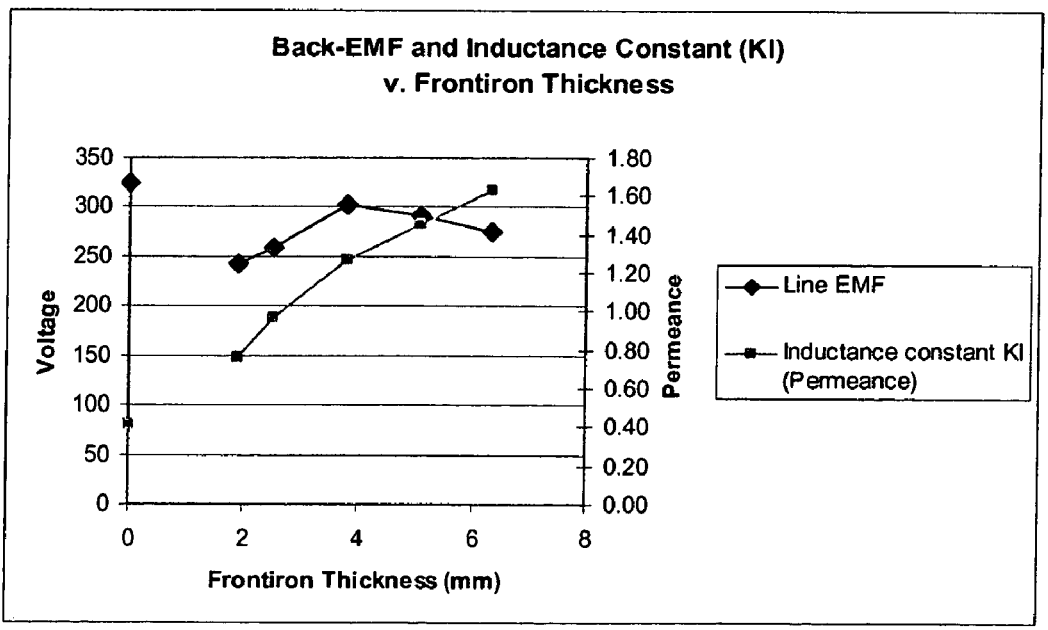
FIG. 7 is a plot of the back-EMF (◇) and the inductance constant (□) versus frontiron thickness of an electric device according to the invention.

As shown in FIG. 7, the expected line EMF drops sharply with the addition of the frontiron. This is believed to result from saturation of the thinner frontiron. As the frontiron thickness increases to 4 mm, the line EMF reaches an optimum, reasonably high value of 300 V.

FIG. 7 also shows that the inductance constant (KI) increases steadily with increasing frontiron thickness. This is believed to be a consequence of the flux path provided by the frontiron linking the stator phase coils together. By way of contrast, the "open-end" configuration of a device without the frontiron provides a higher reluctance for this flux. The inductance is an average inductance calculated by electromagnetic analysis software for the device under a load (torque). The inductance constant varies as a function of the applied current in the case of the frontiron.

Figure 8:
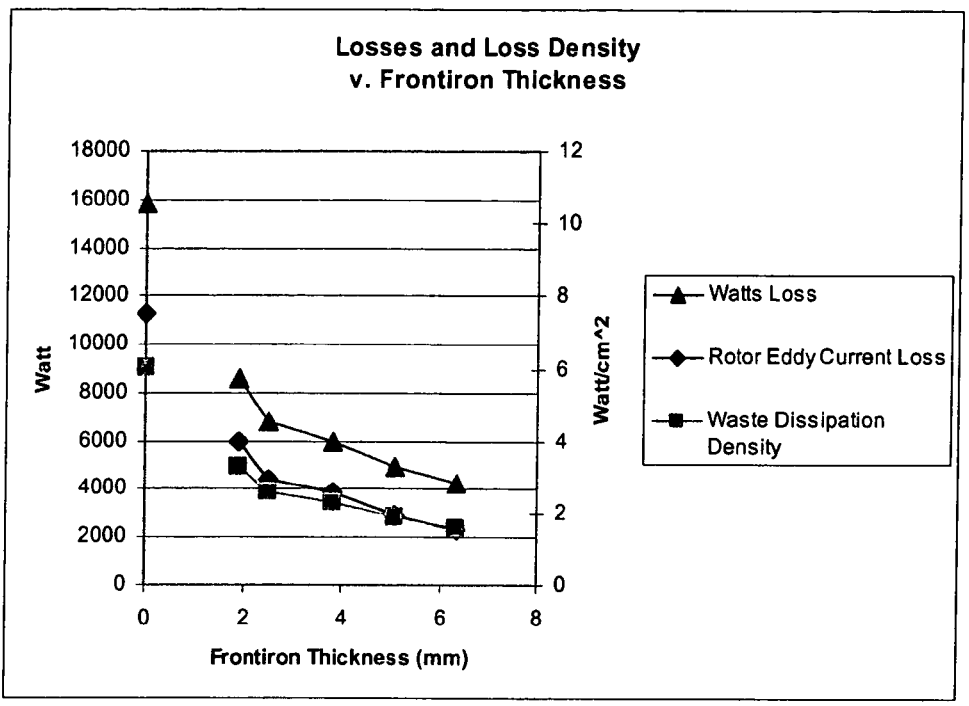
FIG. 8 is a plot of the power loss (Δ), rotor eddy current loss (◇) and waste dissipation loss density (□) versus frontiron thickness of an electric device according to the invention.

An important motivation for introducing the frontiron is reduction of the overall device losses. FIG. 8 shows a plot of the losses and loss density of the device as a function of the frontiron thickness. Surprisingly, the overall device losses can be reduced to 40% of the initial, mainly due to a reduction in losses in the rotor magnets due to eddy currents. This in turn lowers the overall waste dissipation density (W/cm$^2$) of the machine, thereby increasing the available power, torque, and speed, without increasing machine size appreciably. The lower dissipation is attained despite the impact of additional frontiron losses and the increased axial length, and hence increased surface area, with introduction of the frontiron, these factors being included in the loss estimate. As the EMF changes, for a constant power of 100 kW, the current also changes, in turn changing the ohmic losses.

Figure 9:
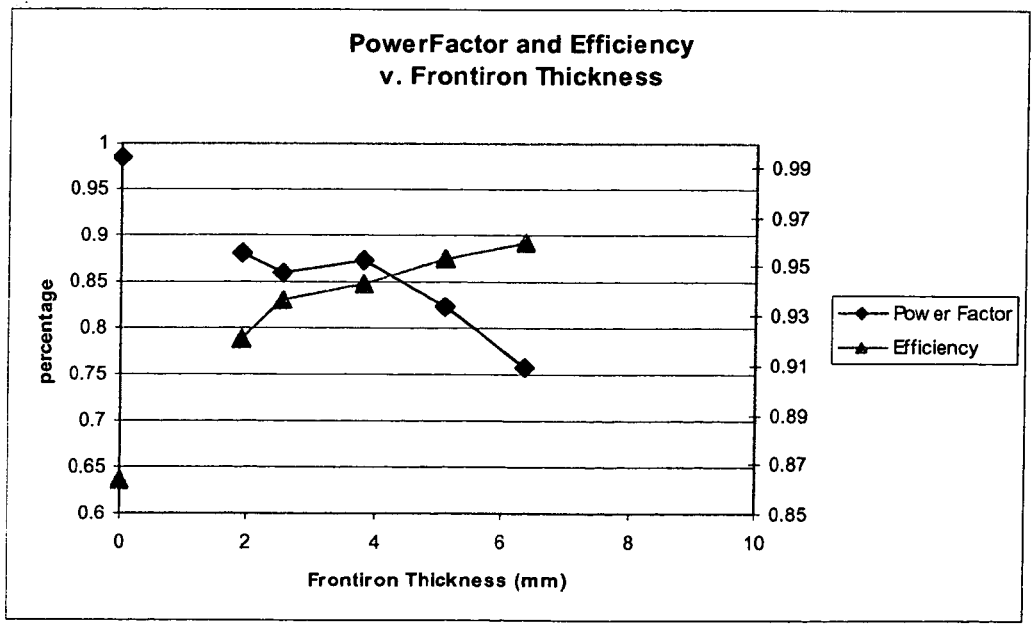
FIG. 9 is a plot of the power factor (◇) and efficiency (Δ) versus frontiron thickness of an electric device according to the invention.
Figure 10:
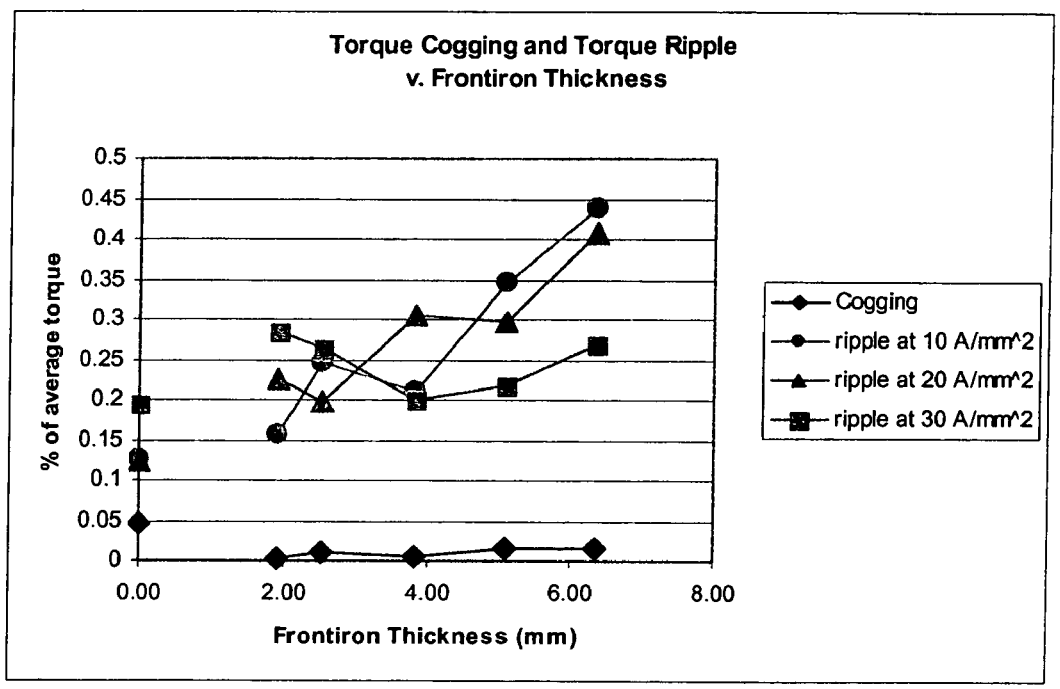
FIG. 10 is a plot of the torque cogging (◇) versus frontiron thickness, and torque ripple versus frontiron thickness at current densities of 10 A/mm$^2$ (□), 20 A/mm$^2$ (◇), and 30 A/mm$^2$ (□), of an electric device according to the invention.

FIG. 9 shows that the power factor decreases with frontiron thickness, as the inductance increases, which counts as a penalty in adding the frontiron. However, the efficiency increases dramatically, as a result of the savings in magnet eddy current losses. FIG. 10 shows that torque cogging is reduced as the frontiron thickness is increased. However, there is an increase in torque ripple with increasing frontiron thickness. These are preferably taken into account in optimizing the frontiron thickness and the device performance.

The optimum frontiron thickness is found to be in the range of 4–5 mm for the low pole count, high frequency, 15 KRPM electric device. The addition of the frontiron results in lower rotor heating, reducing heating from a high of about 16 kW to a low of about 2 kW. The addition of the frontiron also results in higher efficiency. A frontiron thickness of 4 mm is readily manufactured with currently available technology.

Having thus described the invention with rather full detail, it will be understood that such detail need not be strictly adhered to, but that various changes and modifications may suggest themselves to one skilled in the art. For example, although axial gap electric machines have been generally described herein, other types of electric machines may be designed according to the principles disclosed herein, such as radial gap machines or linear machines. Furthermore, the electric machines could include a number of types of electric machines other than permanent magnet machines, such as induction machines, synchronous machines, synchronous reluctance machines, switch reluctance machines, and dc electromagnet machines. In addition, other types of rotors and/or stator winding schemes are within the scope of the present invention. It is accordingly intended that such modifications be encompassed by the scope of the invention, as defined by the subjoined claims.

What is claimed is:

1. A dynamoelectric machine, comprising:
   (a) at least one stator assembly comprising a backiron section and a plurality of tooth sections, said stator assembly having a slot between each adjacent pair of said tooth sections and stator windings wound through said slots;
   (b) a frontiron section; and
   (c) at least one rotor assembly supported for rotation about an axis and including a plurality of poles, said rotor assembly being arranged and disposed for magnetic interaction with said at least one stator assembly; and
   wherein at least one of said backiron section, said plurality of tooth sections, and said frontiron section is composed of low core loss magnetic material characterized by a core loss less than "L" when operated at an excitation frequency "f" to a peak induction level "$B_{max}$" wherein L is given by the formula $L=12 \cdot f \cdot (B_{max})^{1.5}+30 \cdot f^{2.3} \cdot (B_{max})^{2.3}$, the core loss, excitation frequency and peak induction level being measured in watts per kilogram, kilohertz, and teslas, respectively.

2. The machine of claim 1, said machine being an axial airgap device.

3. The machine of claim 1, said machine being a radial airgap device.

4. The machine of claim 1, wherein said frontiron section is a part of said stator assembly.

5. The machine of claim 1, wherein said backiron section and said tooth sections are composed of said low core loss magnetic material.

6. The machine of claim 1, wherein said low core loss magnetic material comprises laminated layers composed of at least one material selected from the group consisting of amorphous metal, nanocrystalline metal, and optimized Fe-based alloy.

7. The machine of claim 6, wherein said laminated layers are composed of amorphous metal.

8. The machine of claim 6, wherein said laminated layers are composed of nanocrystalline metal.

9. The machine of claim 6, wherein said laminated layers are composed of optimized Fe-based alloy.

10. The machine of claim 1, wherein said frontiron section is attached to said rotor assembly.

11. The machine of claim 4, wherein at least one of said frontiron section and said backiron section is formed as a unitary structure comprising said tooth sections.

12. The machine of claim 1, wherein said rotor assembly comprises a plurality of rotor permanent magnets.

13. The machine of claim 12, wherein said magnets are composed of a rare earth-transition metal alloy.

14. The machine of claim 13, wherein said magnets are SmCo or FeNdB magnets.

15. The machine of claim 2, wherein said rotor assembly comprises a rotor having a plurality of rotor permanent magnets disposed with alternating polarity and securely positioned circumferentially about said rotor with substantially equal spacing.

16. The machine of claim 1, having a slot per phase per pole ratio that ranges from about 0.25 to 4.0.

17. The machine of claim 16, wherein the slot per phase per pole ratio ranges from about 0.25 to 1.

18. The machine, of claim 17, wherein the slot per phase per pole ratio is 0.50.

19. The machine of claim 1, having at least 16 poles.

20. The machine of claim 1, having at least 32 poles.

21. The machine of claim 1, adapted to run with a commutating frequency ranging from about 500 Hz to 3 kHz.

22. The machine of claim 21, wherein the commutating frequency ranges from about 600 to 1000 Hz.

23. The machine of claim 2, comprising two stator assemblies and a rotor assembly disposed therebetween.

24. The machine of claim 2, wherein said frontiron section comprises a wound toroid of low core loss magnetic material.

25. A method for constructing a dynamoelectric machine, comprising:
   (a) providing at least one stator assembly comprising a backiron section and a plurality of tooth sections, said stator assembly having a slot between each adjacent pair of said tooth sections and stator windings wound through said slots;
   (b) providing a frontiron section; and
   (c) providing at least one rotor assembly supported for rotation about an axis and including a plurality of poles, said rotor assembly being arranged and disposed for magnetic interaction with said at least one stator assembly; and
   wherein at least one of said backiron section said plurality of tooth sections, and said frontiron section is composed of low core loss magnetic material characterized by a core loss less than "L" when operated at an excitation frequency "f" to a peak induction level "$B_{max}$" wherein L is given by the formula $L=12 \cdot f \cdot (B_{max})^{1.5}+30 \cdot f^{2.3} \cdot (B_{max})^{2.3}$, the core loss, excitation frequency and peak induction level being measured in watts per kilogram kilohertz, and teslas respectively.

26. The method of claim 25, wherein said machine is an axial airgap device.

27. The method of claim 26, wherein said backiron section and said tooth sections are composed of said low core loss magnetic material.

28. The method of claim 26, wherein said low core loss magnetic material comprises laminated layers composed of at least one material selected from the group consisting of amorphous metal, nanocrystalline metal, and optimized Fe-based alloy.

29. The method of claim 28, wherein at least one of said frontiron section and said backiron section is formed as a unitary structure comprising said tooth sections, said unitary structure being formed by a process comprising the steps of:
   (a) spirally winding a toroid of said laminated layers of low core loss magnetic material, said toroid having an inside diameter, an outside diameter, and a toroid height; and
   (b) cutting a plurality of slots extending in substantially radial direction from said inside diameter to said outside diameter, and having a slot depth less than said toroid height.

30. The method of claim 28, wherein said frontiron section is formed by spirally winding a toroid of said laminated layers of low core loss magnetic material.

31. A dynamoelectric machine system, comprising a dynamoelectric machine and power electronics means for interfacing and controlling the machine and being operably connected thereto, the machine comprising:
(a) at least one stator assembly comprising a backiron section and a plurality of tooth sections, and a frontiron section, said stator assembly having a slot between each adjacent pair of said tooth sections and stator windings wound through said slots;
(b) a frontiron section; and
(c) at least one rotor assembly supported for rotation about an axis and including a plurality of poles, said rotor assembly being arranged and disposed for magnetic interaction with said at least one stator assembly; and wherein at least one of said backiron section, said plurality of tooth section, and said frontiron section is composed of low core loss magnetic material characterized by a core loss less than "L" when operated at an excitation frequency "f" to a peak induction level "$B_{max}$" wherein L is given by the formula $L=12 \cdot f \cdot (B_{max})^{1.5} + 30 \cdot f^{2.3} \cdot (B_{max})^{2.3}$, the core loss, excitation frequency and peak induction level being measured in watts per kilogram, kilohertz, and teslas, respectively.

* * * * *